United States Patent
Jones

(10) Patent No.: US 7,251,816 B2
(45) Date of Patent: Jul. 31, 2007

(54) METHOD FOR INCREASING PERFORMANCE OF SELECT AND POLL APPLICATIONS WITHOUT RECOMPILATION

(75) Inventor: Richard A. Jones, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 10/215,995

(22) Filed: Aug. 8, 2002

(65) Prior Publication Data

US 2004/0031044 A1 Feb. 12, 2004

(51) Int. Cl.
*G06F 9/54* (2006.01)
*G06F 15/16* (2006.01)

(52) U.S. Cl. .................. 719/328; 719/330; 719/331; 719/332; 709/227; 709/230

(58) Field of Classification Search ........ 719/328–332, 719/311–318; 717/136–161; 709/201–250; 718/100–107
See application file for complete search history.

(56) References Cited

U.S. PATENT DOCUMENTS 6,141,698 A * 10/2000 Krishnan et al. ........... 719/331
6,609,159 B1 * 8/2003 Dukach et al. ............. 719/331
6,732,211 B1 * 5/2004 Goyal et al. ................ 710/261
2003/0172127 A1 * 9/2003 Northrup et al. ........... 709/219

OTHER PUBLICATIONS

Joseph Hlavaty; "The Winmock Library"; Dr. Dobb's Journal; Jul. 1996, vol. 21, No. 7.

* cited by examiner

*Primary Examiner*—William Thomson
*Assistant Examiner*—Charles Anya

(57) ABSTRACT

A method for increasing performance of selected poll applications without recompilation. In one embodiment, the method is comprised of assigning the name of a library as a value for an environment variable in a software application. The library is comprised of software code for emulating a system call. The method is further comprised of launching the software application. The launching causes invocation of a loader associated with the software application. The method is further comprised of preloading the library into the software application. The preloading performed by the loader. The method is further comprised of redirecting the software application to invoke an alternative mechanism when the software application requests a system call. The invocation of the alternative mechanism implements the library as the system call. The method is further comprised of registering a plurality of file descriptors and events of interest with the alternative mechanism when the application makes said system call with a list of file descriptors identifying sockets for which the application has interest in events. Each of said plurality said file descriptors is related to an event of interest pertaining to an associated socket of interest. Those sockets with registered file descriptors are examined by the software application.

28 Claims, 4 Drawing Sheets

300

```
┌─────────────────────────────────────────────────────────────────────────┐
│ Assigning the name of a library as a value for an environment variable in a software application. │
│ The library contains code for replacing system calls in a software application. │
│                                    302                                  │
└─────────────────────────────────────────────────────────────────────────┘
                                      │
                                      ▼
         ┌───────────────────────────────────────────────────────┐
         │ Launching the software application, which causes invocation of a │
         │ loader associated with said software application.     │
         │                          304                          │
         └───────────────────────────────────────────────────────┘
                                      │
                                      ▼
         ┌───────────────────────────────────────────────────────┐
         │ Preloading the environment variable into the software application, │
         │ the preloading performed by the loader.               │
         │                          306                          │
         └───────────────────────────────────────────────────────┘
                                      │
                                      ▼
┌─────────────────────────────────────────────────────────────────────────┐
│ Registering a plurality of file descriptors and events of interest with the alternative │
│ mechanism when the application makes said system call with a list of file descriptors │
│ identifying sockets for which the application has interest in events. Each of said │
│ plurality said file descriptors is related to an event of interest pertaining to an associated │
│ socket of interest.                                                     │
│                                    308                                  │
└─────────────────────────────────────────────────────────────────────────┘
                                      │
                                      ▼
┌─────────────────────────────────────────────────────────────────────────┐
│ Redirecting the software application to invoke the alternative mechanism when the │
│ software application requests a system call, and wherein the invocation of the │
│ alternative mechanism implements the library as the system call.        │
│                                    310                                  │
└─────────────────────────────────────────────────────────────────────────┘
                                      │
                                      ▼
         ┌───────────────────────────────────────────────────────┐
         │ Accessing those sockets having file descriptors registered with the │
         │ alternative mechanism for which events of interest are indicated. │
         │                          312                          │
         └───────────────────────────────────────────────────────┘
```

FIGURE 3

METHOD FOR INCREASING PERFORMANCE OF SELECT AND POLL APPLICATIONS WITHOUT RECOMPILATION

TECHNICAL FIELD

Embodiments of the present invention are related to increasing performance of software applications. More particularly, the present invention provides a method to increase performance of software applications without requiring application recompilation.

BACKGROUND ART

In a computer system or a computer network, a port number identifies a sending or destination application. Every application running on a host computer system uses certain ports or ranges of ports to communicate with other applications running on other host computer systems. It is by these port numbers that a communication protocol, e.g., TCP (transmission control protocol) or UDP (user datagram protocol) determines which application to pass the data to in the application layer.

When an application on one computer system wants to communicate with an application on another computer system, it must specify the address of the device (IP address) and identify the application (port number). The combination of sending and destination port numbers and the sending and destination IP addresses defines a socket. A socket can be used to uniquely define a UDP or TCP connection.

Applications, e.g., Internet applications, were initially written to handle one or two sockets. Internet applications, e.g., Telnet, UDP, or TCP, etc., typically handle one or two sockets, and accordingly, handle one or two connections at a time. With each socket are associated socket calls. A socket call can be, but is not limited to, a call to read from the socket, a call to write to the socket, a call for error check on the socket, etc.

The proliferation of the Internet, and more particularly the World Wide Web, has caused, in part, the development of a web server, a type of computer system that is adapted to serve/handle numerous sockets. Many of today's current web servers can handle thousands of concurrent sockets/connections.

The socket calls are the same as those listed above, e.g., read, write, and error check, but instead of one or two sockets to handle, there are commonly hundreds if not thousands of sockets that can be simultaneously opened. This means that the application will check each of the sockets for read, write, and/or error check. Accordingly, applications use vast amounts of processing time performing socket calls on the thousands of sockets. Disadvantageously, other useful work or processes may not be performed while the Internet application is performing these thousands upon thousands of socket calls.

To overcome this drawback, system calls, e.g., select system call and poll system call, were developed to be able to inform the application, e.g., an Internet application, when it is permitted to read from a socket or permitted to write to a socket.

The system calls are not without drawbacks associated therewith. When a poll call or a select call was made, the kernel would go through every socket opened by the application in the poll or select call, locking and unlocking the socket and checking for events of interest. Because there can be hundreds, thousands, or tens of thousands of sockets and each socket is looked at, with some sockets having hold mechanism, this can also use large amounts of processing time.

Hence, many applications are not provided with efficient socket communication.

DISCLOSURE OF THE INVENTION

Thus, embodiments of the present invention are drawn to providing a method for increasing performance in system calls in a software application without recompilation by redirecting certain system calls. Embodiments of the present invention further provide for registration of file descriptors with an alternative event mechanism, wherein each file descriptor can have an event of interest to the application. Embodiments of the present invention further provide for scanning those sockets with file descriptors registered with the alternative event mechanism.

In one embodiment, a method of replacing a system call with an alternative mechanism in a software application is comprised of assigning the name of a library as a value for an environment variable in a software application. The library is comprised of software code for emulating a system call. The method is further comprised of launching the software application which causes invocation of a loader associated with the software application. The method is further comprised of preloading the library into the software application. The loader performs the preloading. The method is further comprised of redirecting the software application to invoke an alternative event mechanism when the software application requests a system call. The invocation of the alternative mechanism implements the library as said system call. The method is further comprised of registering a plurality of file descriptors and events of interest with the alternative mechanism when the application makes said system call with a list of file descriptors identifying sockets for which the application has interest in events. Each of said plurality said file descriptors is related to an event of interest pertaining to an associated socket of interest. Those sockets with registered file descriptors are examined by the software application.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3 is a flowchart of showing steps in a process of increasing performance of system calls in a software application without recompilation, in accordance with one embodiment of the present invention.

BEST MODES FOR CARRYING OUT THE INVENTION

Embodiments for a method for increasing performance in selected system calls in a software application without application recompilation are described. Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
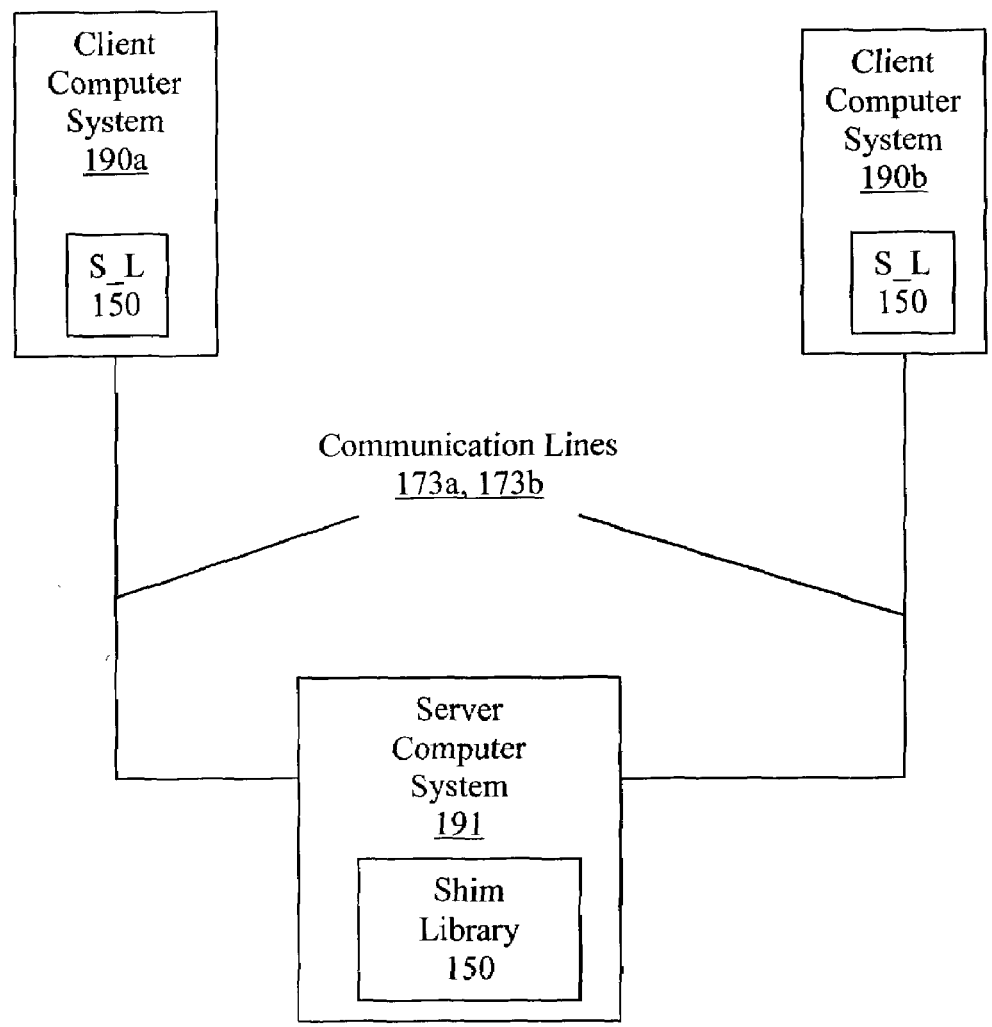
FIG. 1 is an illustration of an exemplary network environment in which embodiments of the present invention can be practiced, in accordance with one embodiment of the present invention.
Figure 2:
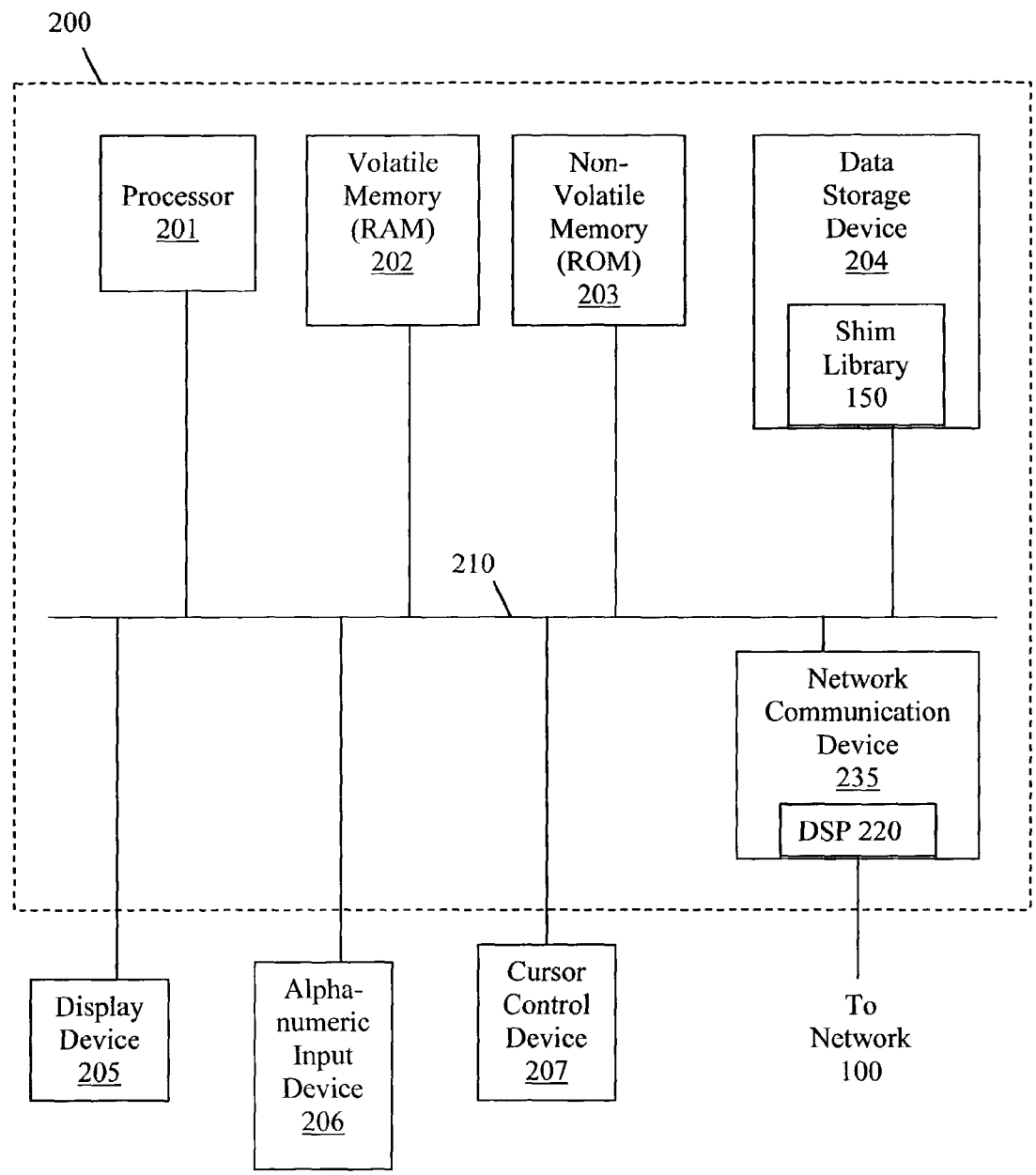
FIG. 2 is a block diagram of a computer system upon which embodiments of the present invention may be practiced, in accordance with one embodiment of the present invention.

The method for increasing performance in an application is, in one embodiment, comprised of a library of computer instructions, e.g., shim library 150 of FIGS. 1 and 2, that provides an alternative to certain system calls associated with an application including, but not limited to, select system calls, poll system calls, and close calls. The shim library contains code that provides information related to those events of interest on sockets of interest. Those events of interest on sockets of interest are automatically registered with the alternative event mechanism on behalf of the application. The shim library, when invoked, obviates the application's select and poll system calls, and in their stead utilizes a functionality contained within the operating system under which the application runs, e.g., Eventports, to initiate functions analogous to the obviated system calls.

Advantages of embodiments of the present invention, as will be shown, below, are that the shim library is invoked autonomous with loading of the application. Another advantage is that by virtue of the shim library being modified, the application does not require recoding or recompiling. Additionally advantageous is that the shim library commonly reduces processor time used during system calls by only examining those sockets that have been registered and have pending events of interest, when compared with conventional system calls where each socket is examined.

Embodiments of the present invention are discussed primarily in the context of software applications which can simultaneously service or handle multiple sockets, e.g., Internet applications, in a network and/or client server environment. However, it is noted that embodiments of the present invention can be utilized by other software applications that are adapted to simultaneously service or handle multiple sockets including, but not limited to, Internet applications.

FIG. 1 is a block diagram illustrating an exemplary client-server computer system network, e.g., network 100, upon which embodiments of the present invention may be practiced. Network 100 may be a communication network located within a firewall of an organization or corporation (an "Intranet"), or network 100 may represent a portion of the World Wide Web or Internet. Client (or user) computer systems 190a and 190b and server computer system 191 are communicatively coupled via communication lines 173a and 173b; the mechanisms for coupling computer systems over the Internet or over Intranets are well-known in the art. This coupling can be accomplished over any network protocol that supports a network connection, such as IP (Internet Protocol), TCP (Transmission Control Protocol), UDP (User Datagram Protocol), TELNET, NetBIOS, IPX (Internet Packet Exchange), and LU6.2, and link layers protocols such as Ethernet, token ring, and ATM (Asynchronous Transfer Mode). Alternatively, client computer systems 190a and 190b can be coupled to server computer system 191 via an input/output port (e.g., a serial port) of server computer system 191; that is, client computer systems 190a and 190b and server computer system 191 may be non-networked devices. It is appreciated that, for simplicity, only two client computer systems and a single server computer system are shown; however, it is understood that network 100 may comprise any number of client computer systems and server computer systems.

Still referring to FIG. 1, also shown, in one embodiment, is a library of instructions, e.g., shim library 150 (S_L 150), representing embodiments of the present invention that are disposed in server 191. In one embodiment, shim library 150 is also disposed in client computers 190a and 190b as well. In one embodiment, shim library 150 (S_L 150) contains a collection of software instructions or code that is used in place of some of the system calls that applications make during operation, e.g., select system calls and poll system calls.

FIG. 2 is a block diagram illustrating components and circuitry of an exemplary computer system 200, which can be implemented within a client computer system, e.g., client computer system 190a and/or 190b, and in a server computer system, e.g., server computer system 190, of FIG. 1, upon which embodiments of the present invention may be practiced. Computer system 200 includes an address/data bus 210 for communicating information, a central processor 201 coupled with the bus for processing information and instructions, a volatile memory 202 (e.g., random access memory, RAM) coupled with the bus 210 for storing information and instructions for the central processor 201 and a non-volatile memory 203 (e.g., read only memory, ROM) coupled with the bus 210 for storing static information and instructions for the processor 201. It is noted that in one embodiment, computer system 200 can be configured with a plurality of processors 201.

Computer system 200 of FIG. 2 also includes a data storage device 204 coupled with bus 210 for storing information and instructions, e.g., shim library 150. Data storage device 204 can be, for example, an HDD (hard disk drive), an FDD (floppy disk drive), a memory stick, a CD-RW (compact disk with write functionality), a tape drive, etc., and furthermore device 204 can be in multiples or in a combination thereof. Data storage device 204 may also be multiply instanced, removable, and/or hot swappable (connected or unconnected while computer is powered).

With reference still to FIG. 2, computer system 200 also includes a network communication device 235, which is coupled to bus 210 for providing a communication link between computer system 200, and a network environment, e.g., network environment 100 of FIG. 1. As such, network communication device 235 enables central processor unit 201 to communicate with other electronic systems coupled to the network, e.g., network 100 of FIG. 1. It should be appreciated that the present embodiment of network communication device 235 is well suited to be implemented in a wide variety of ways. In one example, network communication device 235 is coupled to an antenna and provides the functionality to transmit and receive information over a wireless communication interface. In another example, network communication device 235 could be implemented as a modem. In yet another example, network communication device 235 could be configured as a NIC (network interface card).

Still referring to FIG. 2, network communication device 235, in one embodiment, includes an optional digital signal processor (DSP) 220 for processing data to be transmitted or data that are received via network communication device 235. Alternatively, processor 201 can perform some or all of the functions performed by DSP 220.

Also included in computer system 200 of FIG. 2 is an optional alphanumeric input device 206. In one implementation, device 206 is a keyboard. Alphanumeric input device 206 can communicate information and command selections to processor 201.

Computer system 200 of FIG. 2 also includes an optional cursor control or directing device (on-screen cursor control 207) coupled to bus 210 for communicating user input information and command selections to processor 201. Many implementations of the cursor control device are known in the art including a trackball, mouse, joystick or special keys on alphanumeric input device 206 capable of signaling movement of a given direction or manner of displacement. It is to be appreciated that the cursor control 207 also may be directed and/or activated via input from the keyboard using special keys and key sequence commands. Alternatively, the cursor may be directed and/or activated via input from a number of specially adapted cursor directing devices.

In one implementation, on-screen cursor control device 207 is a touch screen device incorporated with display device 205. On-screen cursor control device 207 is capable of registering a position on display device 205 where a pointing object, e.g., a stylus or a user's finger, makes contact. In another implementation, on-screen cursor control device 207 is a touch pad, or, in another implementation, a finger activated push stick. In another common implementation, on-screen cursor control device 207 is a mouse or similar pointing device.

Computer system 200 also contains a display device 205 coupled to the bus 210 for displaying information to the computer user. Display device 205 is suitable for generating graphic images and alphanumeric characters recognizable to the user. Any of a number of display technologies can be used, e.g., cathode ray tube (CRT), liquid crystal display (LCD), field emission display (FED), thin film transistor (TFT), plasma, etc., for display device 205.

Referring, collectively, to functionalities provided by embodiments of the present invention, a shim library, e.g., shim library 150 of FIGS. 1 and 2, is adapted to take an application's, e.g., an Internet application's, select, poll, and close system calls (select( ), poll( ), and close( ), respectively) and turn those select and poll system calls into eventport calls in a manner invisible to the application. In one embodiment, shim library 150 is comprised of two portions, as seen in Appendices A and B. In the present embodiment, Appendix A is related to poll system calls and Appendix B is related to select system calls. It is noted that each portion of shim library 150, Appendices A and B, also contain therein close( ) call related instructions for poll system calls and select system calls. Eventports is an alternative event notification mechanism contained within the operating system under which the application is operable. It is noted that other alternative event notification mechanisms having analogous functionality to eventports can be utilized under embodiments of the present invention.

With reference to poll system calls, as shown in Appendix A, and more particularly shown in SECTION 5 thereof, the present invention, shim library 150, provides, in one embodiment, a table/tree structure which contains information regarding event ports. In one embodiment, there is one event port file descriptor for each unique array of pollfds (poll file descriptors) from the application. When the application calls poll, e.g., poll( ), there is found an associated eventport. The application then walks, or scans, the applications poll( ) array. Each of the file descriptors in the pollfd array is checked against the list of fds (file descriptors) registered with the alternative event notification mechanism, e.g., eventports, as shown in SECTION 3 of Appendix A. In one embodiment, when the fd has been previously registered, with the events the application has placed in the event field of the pollfd structure for that fd, the library proceeds to the next fd. In one embodiment, when the fd has not been previously registered with the events the application has requested, the library will register that fd and subsequent thereto, move to the next fd.

In one embodiment, when the registration fails, functionalities contained within shim library 150 provide for a seamless reverting back to a real poll( ) system call, using those arguments provided by the application. In one embodiment, when the events field of the pollfd struct is for an undesired event type, shim library 150 also provides for a seamless reverting back to calling a real poll( ) system call, using those arguments provided by the application.

In one embodiment, an optional threshold and limit can be set, such that if the number of file descriptors reference in the application's call to poll or select is below a minimum (threshold) or above a maximum (limit), the library will revert back to calling a real poll( ) using those arguments provided by the application, as shown in SECTION 1 of Appendix A.

In one embodiment, when scanning the application's pollfd array, and there is a file descriptor greater than the size of the application's internal arrays, the application will revert back to calling a real poll( ) using those arguments provided by the application.

In one embodiment, once an fd (file descriptor) is registered to an eventport, it will not be immediately de-registered when not part of a subsequent poll( ) call. In one embodiment, an optional threshold for de-registering a fd can be set, such that for a given fd that is not part of a poll( ) call for a given set of pollfds N times in succession, that fd will be de-registered. It is noted that by virtue of not immediately de-registering fds from eventports, when the library makes the ioctl (input/output control) to retrieve events from the eventports, there can be some fds that are not of interest to the application. If none of the application's fds are returned by the ioctl from the eventports, there can be a pause prior to a subsequent ioctl retrieval of events from the eventports, in one embodiment. In another embodiment, the application would de-register interest in those fds in which the application is not interested and then attempt the ioctl retrieval of events or in yet another embodiment, revert back to a real poll( ) call, as is shown collectively in SECTION 4 of Appendix A.

With reference to select system calls, as shown in Appendix B, and more particularly with reference to SECTION 5 thereof, the present invention, shim library 150, provides, in one embodiment, a table/tree structure which contains information regarding event ports. In one embodiment, there is one event port file descriptor for each unique array of fd_sets from the application. When the application calls select, e.g., select( ), with the fd_set array address, there is found an associated eventport. The application then walks, or scans, the applications fd_set array. Each of the file descriptors in the fd_set array is checked against the list of fds (file descriptors) registered, as described in SECTION 3 of Appendix B, with the alternative event notification mechanism, e.g., eventports. In one embodiment, when the fd has been previously registered, with the events the application has placed in the event field of the fd_set structure for that fd, the application proceeds to the next fd. In one embodiment, when the fd has not been previously registered with the events the application has requested, the application will register that fd and subsequent thereto, move to the next fd.

In one embodiment, when the registration fails, functionalities contained within shim library 150 provide for a seamless reverting back to a real select( ) system call, using those arguments provided by the application. In one embodiment, when the events field of the fd_set struct is for an undesired event type, shim library 150 also provides, for the application, a seamless reverting back to calling a real select( ) system call, using those arguments provided by the application.

In one embodiment, an optional threshold and limit can be set, such that if the number of file descriptors (nfds) registered is below a minimum (threshold) or above a maximum (limit), the application will revert back to calling a real select( ) using those arguments provided by the application, as shown in SECTION 1 of Appendix B.

In one embodiment, when scanning the application's fd_set array, and there is a file descriptor greater than the size of the application's internal arrays, the application will revert back to calling a real select( ) using those arguments provided by the application.

In one embodiment, once an fd (file descriptor) is registered to an eventport, it will not be immediately de-registered when not part of a poll( ) call. In one embodiment, an optional threshold for de-registering a fd can be set, such that for a given fd that is not part of a select( ) call for a given set of fd_sets N times in succession, that fd will be de-registered. It is noted that by virtue of not immediately de-registering fds from eventports, when the application makes the ioctl (input/output control) retrieve events from the eventports, there can be some fds that are not of interest to the application. If none of the application's fds are returned by the ioctl from the eventports, there can be a pause prior to a subsequent ioctl retrieval of events from the eventports, in one embodiment. In another embodiment, the application would de-register interest in those fds in which the application is not interested and then attempt the ioctl retrieval of events or in yet another embodiment, revert back to a real select( ) call, as shown collectively in SECTION 4 of Appendix B.

In one embodiment, there is a mutex (mutually exclusive) for each unique pollfd array base and fd_set array base called by the application. If there are separate threads calling poll( ) and/or select( ), those threads do not call poll( ) and/or select( ) with the same pollfd array and/orfd_set array, so those threads do not content on the mutex.

In one embodiment, there is a mutex protecting the list of eventports themselves. In one embodiment, the "global" mutex is locked, then the relevant entry is located. It's mutex is unlocked, then the global mutex is unlocked, thus allowing other threads to perform their associated functions and/or tasks. It is noted that in another embodiment, the mutex and global mutex are combined in one large global mutex.

With reference to close system call, e.g., close( ), as shown in SECTION 6 of Appendices A and B, when an application calls close( ), functionalities contained within shim library 150 also intercept the close call, in one embodiment of the present invention. When the application calls close, the application acquires the global mutex and then commences scanning the shim_contexts clearing the fd_context entries for that fd (file descriptor) in each of the allocated contexts. The library is not required to de-register the fd from the eventport, that is accomplished by automatically when the application calls the real close( ).

Subsequently, when the application gets the fd again and calls poll( ) with it in one of the pollfd structures and/or when the application gets the fd again and calls select( ) with it in one of the fd_set structures, the pollfd structures and the fd_set structure will be re-registered into the appropriate shim context.

FIG. 3 is a flowchart 300 of steps performed in accordance with one embodiment of the present invention for providing a method for increasing performance of selected system calls, e.g., select system call and poll system call, in a software application without recompilation. Flowchart 300 includes processes of the present invention which, in one embodiment, are carried out by processors and electrical components under the control of computer readable and computer executable instructions. The computer readable and computer executable instructions reside, for example, in data storage features such as computer usable volatile memory 202 and/or computer usable non-volatile memory 203 and/or data storage device 204 of FIG. 1. However, the computer readable and computer executable instructions may reside in any type of computer readable medium. Although specific steps are disclosed in flowchart 300, such steps are exemplary. That is, the present invention is well suited to performing various other steps or variations of the steps recited in FIG. 3. Within the present embodiment, it should be appreciated that the steps of flowchart 300 may be performed by software, by hardware or by any combination of software and hardware.

In step 302 of FIG. 3, the name of the library, e.g., shim library 150 (shim_lib) of FIGS. 1 and 2 and Appendices A and B, is assigned as the value for an environmental variable in a software application, in one embodiment of the present invention. Shim library 150 contains, in one embodiment, software code for replacing system calls made by an application, e.g., an Internet application, during the operation of the application.

In step 304 of FIG. 3, the software application is launched. There are many well known methods to launch an application including, but not limited to, using a command line interface or a graphical user interface to invoke the executable file associated with the software application. Launching of the software application causes the invocation of a loader associated with the software application.

In step 306 of FIG. 3, the loader preloads the library whose name is specified in the environment variable, e.g., shim library 150 of FIG. 2 into the software application, in one embodiment of the present invention. In one embodiment, the operating system, under which the software application is operable, has the preloading functionality contained therein, and accordingly provided the preloading natively. In another embodiment, patches, in the form of software code, may be added to the operating system to provide the preloading functionality.

In step 308 of FIG. 3, subsequent to launching the software application, the software application, in this example an Internet application, opens a plurality of sockets and also creates a plurality of file descriptors related to each of the opened sockets. Each file descriptor is related to an event of interest pertaining to an associated socket of interest. These file descriptors are registered with an alternative event notification mechanism, as shown in SECTION 3 of Appendices A and B, whose functionality is contained within the operating system under which the software application is operable.

Still referring to step 308, in one embodiment, the alternative event notification mechanism is eventports. In one embodiment, eventports is native to the operating system, meaning its functionality is contained within the operating system. In another embodiment, patches can also applied to the operating system to provide eventport functionality to those operating systems not natively configured with eventports. It is noted that nearly any alternative event notification mechanism can also benefit from functionalities provided by embodiments of the present invention.

Still referring to FIG. 3, in one embodiment, the operating system under which the software application is operable is a Unix type operating system including, but not limited to, Unix, Linux, Apple OS X (a Unix derivative), and the like. It is noted that other operating systems may also benefit from functionalities provided by embodiments of the present invention, provided those other operating systems are configured with preloading and alternative event notification mechanism functionalities.

In step 310 of FIG. 3, the software application, e.g., an Internet application, is redirected to invoke an alternative event notification mechanism, e.g., eventports, when the application makes a system call, e.g., a select system call and/or a poll system call. The invocation of the eventports causes shim library 150 to be implemented so as to replace the system calls including, but not limited to select system calls and poll system calls.

In step 312 of FIG. 3, by virtue of registering events of interest on sockets of interest with eventports, only those sockets that have events so registered are checked for events of interest. Advantageously, this provides a substantial reduction in the number of sockets that are scanned, thus reducing CPU usage and time consumed.

Figure 4:
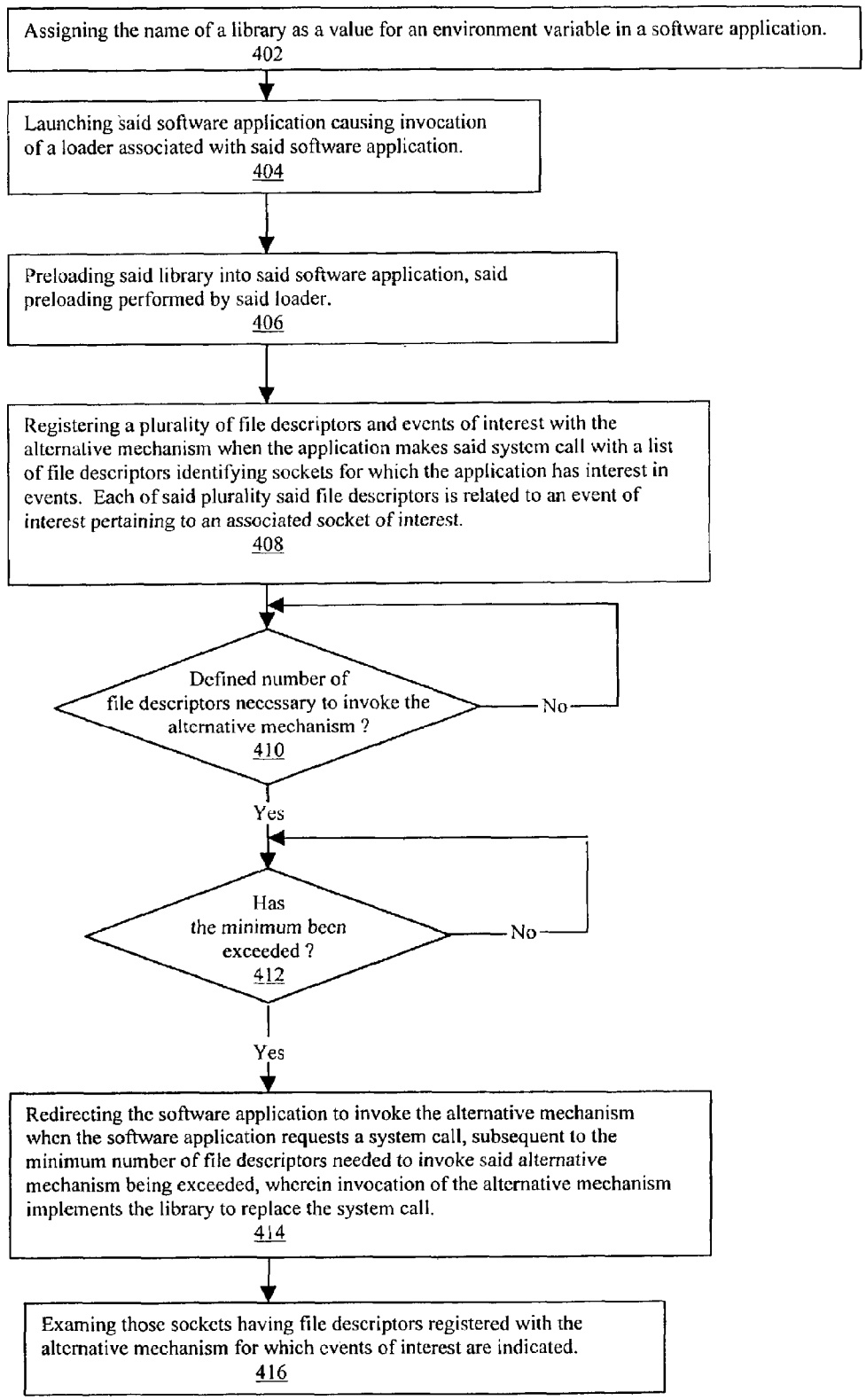
FIG. 4 is a flowchart of showing steps in another process of increasing performance of system calls in a software application without recompilation, in accordance with another embodiment of the present invention.

FIG. 4 is a flowchart 400 of steps performed in accordance with another embodiment of the present invention for providing a method for increasing performance of selected system calls, e.g., select system call and poll system call, in a software application without recompilation. Flowchart 400 includes processes of the present invention which, in one embodiment, are carried out by processors and electrical components under the control of computer readable and computer executable instructions. The computer readable and computer executable instructions reside, for example, in data storage features such as computer usable volatile memory 202 and/or computer usable non-volatile memory 203 and/or data storage device 204 of FIG. 2. However, the computer readable and computer executable instructions may reside in any type of computer readable medium. Although specific steps are disclosed in flowchart 400, such steps are exemplary. That is, the present invention is well suited to performing various other steps or variations of the steps recited in FIG. 4. Within the present embodiment, it should be appreciated that the steps of flowchart 400 may be performed by software, by hardware or by any combination of software and hardware.

In step 402 of FIG. 4, the name of the library, e.g., shim library 150 (shim_lib) of Appendices A and B, is assigned as the value for an environmental variable in a software application, in one embodiment of the present invention. Shim library 150 contains, in one embodiment, software code for replacing system calls made by an application, e.g., an Internet application, during the operation of the application.

In step 404 of FIG. 4, the software application is launched. There are many well known methods to launch an application including, but not limited to, using a command line interface or a graphical user interface to invoke the executable file associated with the software application. Launching of the software application causes the invocation of a loader associated with the software application. In one embodiment, the operating system under which the software application is operable is a Unix type operating system including, but not limited to Unix, Linux, Apple OS X (a Unix derivative), and the like. It is noted that other operating systems may also benefit from functionalities provided by embodiments of the present invention, provided those other operating systems are configured with preloading and alternative event notification mechanism functionalities.

In step 406 of FIG. 4, the loader preloads the environment variable, e.g., shim library 150 of FIG. 2 into the software application, in one embodiment of the present invention. In one embodiment, the operating system, under which the software application is operable, has the preloading functionality contained therein, and accordingly provided the preloading natively. In another embodiment, patches, in the form of software code, may be added to the operating system to provide the preloading functionality.

In step 408 of FIG. 4, a plurality of file descriptors are registered with the alternative event notification mechanism, e.g., eventports, as shown in SECTION 3 of Appendices A and B, in one embodiment of the present invention. The file descriptors are created by the operating system when sockets are opened by the application. Each of the plurality of file descriptors is related to an event of interest pertaining to an associated socket.

In step 410 of FIG. 4, there can be a defined minimum number of file descriptors that would need to be registered with eventports before eventports can be invoked, in one embodiment of the present invention, as shown in SECTION 1 of Appendices A and B. In one embodiment, the minimum number of registered file descriptors is 128 file descriptors, In another embodiment, a greater number or a fewer number of registered file descriptors can be specified to invoke the alternative event notification mechanism.

In step 412 of FIG. 4, by virtue of the defined number of registered file descriptors necessary to invoke the alternative event notification mechanism, as described in step 410, above, until that minimum is exceeded, eventports will not be invoked, in one embodiment of the present invention. This means that when the application makes a poll or select system call, the real poll and select call will be made. However, once the minimum has been exceeded, the alternative event notification mechanism is invoked.

In step 414 of FIG. 4, the software application, e.g., an Internet application, is redirected to invoke an alternative event notification mechanism, e.g., eventports, when the application makes a system call, e.g., a select system call and/or a poll system call. The invocation of the eventports causes shim library 150 to be implemented so as to replace the system calls including, but not limited to select system calls and poll system calls.

In step 416 of FIG. 4, by virtue of registering events of interest of sockets of interest with eventports, only those sockets that have events so registered are checked for events of interest. Advantageously, this provides a substantial reduction in the number of sockets that are scanned, thus reducing CPU usage and time consumption.

In a practical implementation of the present invention, shim library 150 is adapted for an application for a company in the travel industry. The application was already written to use poll( ), so the application was already configured with much of the semantics and syntax needed for Eventports.

This application had its connections spread across three threads calling poll( ) and recv( ) with three other intermediate threads and three threads calling writev( ). So, when the number of connections in the table below shows 1000, it means that each of the calls to poll( ) was for roughly 333 connections.

This application would not poll( ) for write unless necessary. Again the behavior of the application was such that it never needed to poll( ) for write, and again, this is a best practice. The computer network system under test, e.g., computer system 100 implemented in a network environment, e.g., network environment 100 of FIG. 1, was a multiprocessor computer system in a multinode network environment (network 100 of FIG. 1) operating in a UNIX environment with Eventports and miscellaneous other patches installed.

On the client "side" of this computer network system were five multiprocessor computer systems. e.g., computer system 200 of FIG. 2, thus simulating the remote clients, and on the server "side" of this system were another five multiprocessor computer systems for simulating backend-servers. In this example the set of measurements, the SUT was always taken to 100% CPU utilization, so we show Transactions per Second as the unit of measure. It is noted that the connections in this situation One, below.

TABLE ONE

Threaded MUX Application Performance
poll( ) versus Eventports
Transactions per Second

| Connections | poll( ) | Eventport shim library |
|---|---|---|
| 100 | 14110 | 17300 |
| 500 | 8800 | 15700 |
| 1000 | 5700 | 14700 |
| 3000 | 1600 | 13200 |
| 6000 | 750 | 12200 |
| 10000 | 500 | 11200 |
| 19800 | 330 | 9130 |

Table One, above, shows that the performance gain from eventports can be quite considerable. The column labeled "poll( )" is the performance of the application when it was written to use poll( ). The column labeled "eventport shim library" is from when the application was loaded with shim library 150, in one embodiment.

This library would be pre-loaded into the running application image via the LD_PRELOAD functionality and would intercept the application's calls to poll( ) and turn them into Eventport calls. As shown, this was successful, increasing performance considerably.

Thus, embodiments of the present invention are drawn to providing a method for improving performance of selected system calls in an application without application recompilation by invoking a library, e.g., shim library 150, as an alternative to system calls. Further, by virtue of shim library 150 examining only those sockets registered with the alternative event notification mechanism, a substantial reduction in CPU usage is realized. Additionally advantageous is that when additional sockets are to be added, the shim library is recoded, and not the application itself.

The foregoing description of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of replacing a system call with an alternative mechanism in a software application comprising:
    assigning the name of a library as a value for an environment variable in said software application, said library comprising software code for emulating said system call;
    launching said software application, said launching causing invocation of a loader associated with said software application;
    preloading said library into said software application, said preloading performed by said loader;
    redirecting said software application to invoke said alternative mechanism when said software application requests said system call, wherein invocation of said alternative mechanism implements said library as said system call;
    scanning file descriptors registered with said alternative mechanism and events of interest registered with said alternative mechanism upon said software application making said system call, wherein said file descriptors and said events of interest enable avoiding examination of sockets that are not of interest and wherein said alternative mechanism is provided by an operating system that said software application is operable on; and
    registering a plurality of file descriptors and events of interest with said alternative mechanism when said software application makes said system call with a list of file descriptors identifying sockets for which said software application has interest in events, wherein each of said plurality of file descriptors is related to an event of interest pertaining to an associated socket of interest.

2. The method as recited in claim 1 further comprising:
    examining those sockets having file descriptors registered with said alternative mechanism for which events of interest are indicated.

3. The method as recited in claim 1 further comprising:
    defining the number of said file descriptors of interest necessary to invoke said alternative mechanism.

4. The method as recited in claim 3 further comprising:
    invoking said alternative mechanism when the number of said file descriptors exceeds a defined minimum number of file descriptors necessary to invoke said alternative mechanism.

5. The method as recited in claim 1 further comprising:
    reverting to said system call when said library is unable to provide functionality as expected by said software application.

6. The method as recited in claim 1 wherein said system call is a select system call.

7. The method as recited in claim 1 wherein said system call is a poll system call.

8. The method as recited in claim 1 wherein said alternative mechanism is an Eventport.

9. A computer readable medium for storing computer implemented instructions, said instructions for causing computer system to perform:

storing a named library as an environment variable value in a software application, said named library comprising software code for performing processes related to a system call;

launching said software application, said launching causing invocation of a loader associated with said software application;

preloading said named library into said software application, said preloading performed by said loader;

redirecting said software application to invoke an alternative mechanism when said software application requests said system call, wherein invocation of said alternative mechanism implements said named library as said system call; and scanning registered file descriptors and events of interest with said alternative mechanism, wherein a registered file descriptor identifies a socket of interest relative to said software application, said registered file descriptors registered with said alternative mechanism upon said software application making said system call, wherein said alternative mechanism is provided by an operative system that said software application is operable on wherein said computer implementable instructions cause a computer system to perform registering a plurality of file descriptors and events of interest with said alternative mechanism when said software application makes sold system call with a list of file descriptors identifying sockets for which said software application has interest in events, wherein each of said plurality of file descriptors is related to an event of interest pertaining to an associated socket of interest.

10. The computer readable medium of claim 9 wherein said computer implementable instructions cause a computer system to perform examining said sockets having file descriptors registered with said alternative mechanism for which events of interest are indicated.

11. The computer readable medium of claim 9 wherein said computer implementable instructions cause a computer system to perform storing a defined minimum number of file descriptors necessary to invoke said alternative mechanism.

12. The computer readable medium of claim 11 wherein said computer implementable instructions cause a computer system to perform invoking said alternative, mechanism when said defined minimum number of file descriptors is exceeded.

13. The computer readable medium of claim 9 wherein said computer implementable instructions cause a computer system to perform reverting to said system call when said named library is unable to provide functionality as expected by said software application.

14. The computer readable medium of claim 9 wherein said system call is a select system call.

15. The computer readable medium of claim 9 wherein said system call is a poll system call.

16. The computer readable medium of claim 9 wherein said alternative mechanism is an Eventport.

17. A computer system in a computer system network, said computer system comprising:

a bus:

a display device coupled to said bus;

a memory unit coupled to said bus; and a processor coupled to said bus, said processor for executing a method for converting a system call to an alternative mechanism in a software application comprising:

launching said software application, said launching invoking a loader associated with said software application;

preloading a library variable into said software application, said library comprising software code for emulating said system call;

registering a plurality of file descriptors and events of interest with said alternative mechanism when said software application makes said system call with a list of file descriptors identifying sockets for which the application has interest in events, wherein each of said plurality of file descriptors is related to an event of interest pertaining to an associated socket of interest;

redirecting said software application to invoke said alternative mechanism when said software application requests said system call, wherein Invocation of said alternative mechanism implements said library as said system call; and accessing those sockets having file descriptors registered with said alternative mechanism for which events of interest are indicated, wherein said alternative mechanism is provided by an operating system that said software application is operable on.

18. The computer system as described in claim 17 wherein said method is further comprising:

storing a defined minimum number of file descriptors necessary to invoke said alternative mechanism.

19. The compute system as described in claim 18 wherein said method is further comprising:

invoking said alternative mechanism subsequent to the number of said file descriptors exceeding said defined minimum number of file descriptors.

20. The computer system as described in claim 17 wherein said method is further comprising:

reverting to said system call when said library is unable, to provide functionality as expected by said software application.

21. The computer system as described in claim 17 wherein said system call is a select system call.

22. The computer system as described in claim 17 wherein said system call is a poll system call.

23. The computer system as described in claim 17 wherein said alternative mechanism is an Eventport.

24. A system for utilization of an alternative mechanism to convert a system call to a function of a library in a software application comprising:

means for storing and launching a software application;

means for invoking a loader associated with said software application;

means for preloading a library into said software application when said software application is launched, said library comprising software code for emulating said system call;

means for registering a plurality of file descriptors and events of interest with said alternative mechanism when said software application makes said system call with a list of file descriptors identifying sockets for which said software application has interest in events, wherein each of said plurality of file descriptors is related to an event of Interest pertaining to an associated socket of interest;

means for redirecting sold software application to invoke said alternative mechanism when said software application requests said system call, wherein invocation of said alternative mechanism implements said library as said system call; and means for examining those sockets having file descriptors registered with said alternative mechanism for which events of interest are indicated, wherein said alternative mechanism is provided by an operating system that said software application is operable on.

25. The system of claim 24 further comprising:
means for defining the minimum number of said file descriptors necessary to invoke said alternative mechanism.

26. The system of claim 25 further comprising:
means for invoking said alternative mechanism when the number of said file descriptors exceeds said defined minimum of file descriptors.

27. The system of claim 24 further comprising:
means for reverting to said system call when said library is unable to provide functionality as expected by said software application.

28. The system of claim 24 further comprising:
means for containing within the operating system under which said software application is operable functionality of said alternative mechanism.

* * * * *

UNITED STATES PATENT AND TRADEMARK OFFICE
CERTIFICATE OF CORRECTION

PATENT NO. : 7,251,816 B2
APPLICATION NO. : 10/215995
DATED : July 31, 2007
INVENTOR(S) : Richard A. Jones It is certified that error appears in the above-identified patent and that said Letters Patent is hereby corrected as shown below:

In column 12, line 66, in Claim 9, after "causing" insert -- a --.

In column 13, line 22, in Claim 9, delete "operative" and insert -- operating --, therefor.

In column 13, line 23, in Claim 9, after "able on" insert -- , --.

In column 13, line 27, in Claim 9, delete "sold" and insert -- said --, therefor.

In column 13, line 43, in Claim 12, after "alternative" delete ",".

In column 13, line 60, in Claim 17, after "bus" delete ":" and insert -- ; --, therefor.

In column 14, line 17, in Claim 17, delete "Invocation" and insert -- invocation --, therefor.

In column 14, line 29, in Claim 19, delete "compute" and insert -- computer --, therefor.

In column 14, line 36, in Claim 20, after "unable" delete ",".

In column 14, line 61, in Claim 24, delete "Interest" and insert -- interest --, therefor.

UNITED STATES PATENT AND TRADEMARK OFFICE
CERTIFICATE OF CORRECTION

PATENT NO. : 7,251,816 B2
APPLICATION NO. : 10/215995
DATED : July 31, 2007
INVENTOR(S) : Richard A. Jones It is certified that error appears in the above-identified patent and that said Letters Patent is hereby corrected as shown below:

In column 14, line 63, in Claim 24, delete "sold" and insert -- said --, therefor.

Signed and Sealed this

Eighth Day of July, 2008

JON W. DUDAS
*Director of the United States Patent and Trademark Office*